United States Patent
Huang et al.

(10) Patent No.: US 11,008,480 B2
(45) Date of Patent: May 18, 2021

(54) POLYORGANOSILOXANE RELEASE COATING AND METHOD FOR ITS PREPARATION AND USE

(71) Applicant: Dow (Shanghai) Holding Co., Ltd., Shanghai (CN)

(72) Inventors: Fuming Huang, Shanghai (CN); Zhihua Liu, Shanghai (CN)

(73) Assignee: Dow (Shanghai) Holding Co., Ltd, Shanghai (CN)

( * ) Notice: Subject to any disclaimer, the term of this patent is extended or adjusted under 35 U.S.C. 154(b) by 99 days.

(21) Appl. No.: 16/348,277

(22) PCT Filed: Dec. 23, 2016

(86) PCT No.: PCT/CN2016/111781
§ 371 (c)(1),
(2) Date: May 8, 2019

(87) PCT Pub. No.: WO2018/112911
PCT Pub. Date: Jun. 28, 2018

(65) Prior Publication Data
US 2019/0316000 A1    Oct. 17, 2019

(51) Int. Cl.
C09D 183/04 (2006.01)
C08G 77/12 (2006.01)
(Continued)

(52) U.S. Cl.
CPC ........... C09D 183/04 (2013.01); B32B 27/08 (2013.01); C08G 77/12 (2013.01); C08G 77/20 (2013.01); C08K 5/56 (2013.01); C08L 83/04 (2013.01)

(58) Field of Classification Search
CPC ...... C07K 14/415; C08G 77/12; C08G 77/20; C08G 77/08; C08K 5/56; C08K 5/5415;
(Continued)

(56) References Cited

U.S. PATENT DOCUMENTS 3,159,601 A    12/1964 Ashby
3,220,972 A    11/1965 Lamoreaux
(Continued)

FOREIGN PATENT DOCUMENTS

CN   101616995   12/2009
EP    0347895    12/1989
(Continued)

OTHER PUBLICATIONS

Search report from corresponding European 16924790 application, dated Jul. 21, 2020.
(Continued)

*Primary Examiner* — Michael B Nelson
(74) *Attorney, Agent, or Firm* — Catherine U. Brown (57) ABSTRACT

Provided is a release coating composition including a combination of branched polyorganosiloxanes. The first branched siloxane in the combination is an MDQ siloxane of unit formula: $(R^1_3SiO_{1/2})_a(R^2R^1_2SiO_{1/2})_b(R^1_2SiO_{2/2})_c(SiO_{4/2})_d$, $a \geq 0$, $b > 0$, $c \leq 995$, and $d > 0$. The second branched siloxane in the combination is an MDT silsesquioxane of unit formula: $(R^1_3SiO_{1/2})_e(R^2R^1_2SiO_{1/2})_f(R^1_2SiO_{2/2})_g(R^1SiO_{3/2})_h$, $e \geq 0$, $f > 0$, $g \leq 995$, and $h > 0$. Each $R^1$ is independently a monovalent hydrocarbon group free of aliphatic unsaturation and each $R^2$ is an aliphatically unsaturated hydrocarbon group. The release coating composition further includes a crosslinker having at least 3 silicon-bonded hydrogen atoms per molecule, a platinum group metal catalyst and an inhibitor.

15 Claims, 1 Drawing Sheet (51) Int. Cl.
   *C08G 77/20* (2006.01)
   *C08K 5/56* (2006.01)
   *C08L 83/04* (2006.01)
   *B32B 27/08* (2006.01)

(58) Field of Classification Search
   CPC .......... C08K 9/10; C08L 83/00; C08L 83/04; C09D 183/04; C09D 7/40; C12N 15/8261; C12N 15/8273; C12N 15/827; C12N 15/8271; C12N 15/8282; Y02A 40/146; B32B 27/08
   See application file for complete search history.

(56) References Cited

U.S. PATENT DOCUMENTS

| | | | |
|---|---|---|---|
| 3,296,291 | A | 1/1967 | Chalk et al. |
| 3,419,593 | A | 12/1968 | Willing |
| 3,516,946 | A | 6/1970 | Modic |
| 3,814,730 | A | 6/1974 | Karstedt |
| 3,989,668 | A | 11/1976 | Lee et al. |
| 4,374,967 | A | 2/1983 | Brown et al. |
| 4,766,176 | A | 8/1988 | Lee et al. |
| 4,772,515 | A | 9/1988 | Hara et al. |
| 4,774,111 | A | 9/1988 | Lo |
| 4,784,879 | A | 11/1988 | Lee et al. |
| 5,017,654 | A | 5/1991 | Togashi et al. |
| 5,036,117 | A | 7/1991 | Chung et al. |
| 5,077,369 | A | 12/1991 | de Montigny et al. |
| 5,175,325 | A | 12/1992 | Brown et al. |
| 5,942,591 | A | 8/1999 | Itoh et al. |
| 6,806,339 | B2 | 10/2004 | Cray et al. |
| 6,860,339 | B2 | 3/2005 | Lim |
| 8,922,488 | B2 | 12/2014 | Fahlander |
| 9,562,149 | B2 | 2/2017 | Cray et al. |
| 10,155,883 | B2 | 12/2018 | Huang et al. |
| 2003/0088042 | A1 | 5/2003 | Griswold et al. |
| 2004/0254274 | A1 | 12/2004 | Griswold |
| 2005/0038188 | A1 | 2/2005 | Ahn et al. |
| 2006/0128921 | A1 | 6/2006 | Cray et al. |
| 2007/0129507 | A1 | 6/2007 | Irifune |
| 2013/0224502 | A1* | 8/2013 | Nakajima ................. C09J 7/401 428/447 |
| 2016/0244636 | A1* | 8/2016 | Kuo ...................... C09D 183/04 |

FOREIGN PATENT DOCUMENTS

| | | |
|---|---|---|
| EP | 0556023 | 8/1993 |
| EP | 0559575 | 9/1993 |
| JP | 2009249570 | 10/2009 |
| WO | 2006055233 | 5/2006 |
| WO | 2008019953 | 2/2008 |
| WO | 2008084747 | 7/2008 |

OTHER PUBLICATIONS

Search report from corresponding Japan 2019553606 application, dated Jun. 22, 2020. This corrects the error listed on the Supplemental IDS submitted Aug. 6, 2020.

Search report from corresponding European 201410427488.6 application, dated Mar. 1, 2020.

* cited by examiner

POLYORGANOSILOXANE RELEASE COATING AND METHOD FOR ITS PREPARATION AND USE

TECHNICAL FIELD

A silicone release coating composition can be coated on a substrate such as a film or paper and cured via hydrosilylation reaction to form a release liner. The silicone release coating composition may provide one or more benefits over release liners known in the art, such as lower release force and/or good subsequent adhesion strength and/or low migration (to an adhesive adhered to the release liner and/or to the backside of the substrate). The release liner is useful in applications such as for tape release, label release and/or adhesive transfer film.

BACKGROUND

Silicone release coatings are useful in applications where relatively non-adhesive surfaces are required. Single sided liners, such as backing papers for pressure sensitive adhesive labels, are usually adapted to temporarily retain the labels without affecting the adhesive properties of the labels. Double sided liners, such as interleaving papers for double sided and transfer tapes, are used to protect the self-adhesive tapes.

Known silicone release coatings suffer from the drawback that if a release coating composition is formulated to have desirable ultra-low release force, the coating may suffer from migration.

SUMMARY

A release coating composition comprises:
A) a combination of branched polyorganosiloxanes, where the combination comprises
  I) 50 to 90 weight parts of a branched siloxane of unit formula (A-I) $(R^1_3SiO_{1/2})_a(R^2R^1_2SiO_{1/2})_b(R^1_2SiO_{2/2})_c(SiO_{4/2})_d$, where each $R^1$ is independently a monovalent hydrocarbon group free of aliphatic unsaturation and each $R^2$ is an aliphatically unsaturated hydrocarbon group, where subscript a≥0, subscript b>0, subscript c is 15 to 995, and subscript d is >0;
  II) 10 to 50 parts by weight of a silsesquioxane of unit formula (A-II) $(R^1_3SiO_{1/2})_e(R^2R^1_2SiO_{1/2})_f(R^1_2SiO_{2/2})_g(R^1SiO_{3/2})_h$, where subscript e≥0, subscript f>0, subscript g is 15 to 995, and subscript h>0;
  where the amount of the first polyorganosiloxane and the amount of the second polyorganosiloxane combined total 100 weight parts;
B) a crosslinker having at least 3 silicon bonded hydrogen atoms per molecule in an amount sufficient to provide a molar ratio of silicon bonded hydrogen atoms to aliphatically unsaturated groups (SiH:Vi ratio) in the release coating composition of >1:1 to 5:1, based on the weight of the release coating composition;
C) an amount of a platinum group metal catalyst sufficient to provide 1 to 1,000 ppm by weight of a platinum group metal, per 100 parts of starting material A); and
D) 0.001 to 1 parts by weight, per 100 parts of starting material A), of an inhibitor.

The release coating composition can be coated on a substrate and cured via thermal addition cure to prepare a release liner.

DETAILED DESCRIPTION OF THE INVENTION

Figure 1:
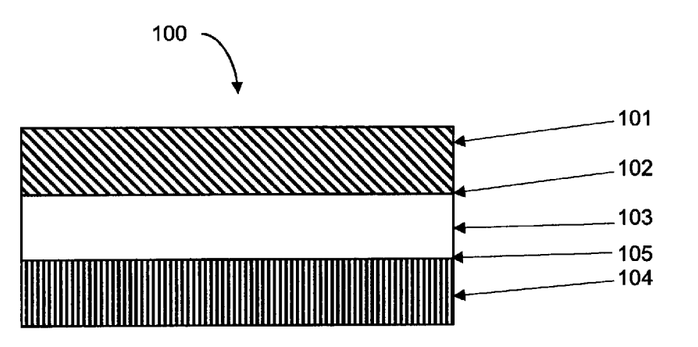
FIG. 1 shows a partial cross section of a release liner 100. The release liner comprises a release coating 101 prepared by curing the composition described above on a first surface 102 of a film substrate 103. The release liner 100 further includes a carrier 104 mounted to an opposing surface 105 of the film substrate 103.

A release coating composition comprises:
A) a combination of branched polyorganosiloxanes, where the combination comprises
  I) 50 to 90 weight parts of a branched siloxane of unit formula (A-I) $(R^1_3SiO_{1/2})_a(R^2R^1_2SiO_{1/2})_b(R^1_2SiO_{2/2})_c(SiO_{4/2})_d$, where each $R^1$ is independently a monovalent hydrocarbon group free of aliphatic unsaturation and each $R^2$ is an aliphatically unsaturated hydrocarbon group, where subscript a≥0, subscript b>0, subscript c is 15 to 995, and subscript d>0;
  II) 10 to 50 parts by weight of a silsesquioxane of unit formula (A-III) $(R^1_3SiO_{1/2})_e(R^2R^1_2SiO_{1/2})_f(R^1_2SiO_{2/2})_g(R^1SiO_{3/2})_h$, where subscript e≥0, subscript f>0, subscript g is 15 to 995, and subscript h>0;
  where amount of the polyorganosiloxane and amount of the silsesquioxane combined total 100 weight parts;
B) a crosslinker having at least 3 silicon bonded hydrogen atoms per molecule in an amount sufficient to provide a molar ratio of silicon bonded hydrogen atoms to aliphatically unsaturated groups (SiH:Vi ratio) in the release coating composition of >1:1 to 5:1, based on the weight of the release coating composition;
C) an amount of a platinum group metal catalyst sufficient to provide 1 to 1,000 ppm by weight, per 100 parts of starting material A) of a platinum group metal; and
D) 0.001 to 1 parts by weight, per 100 parts by weight of starting material A) of an inhibitor.

The release coating composition may optionally further comprise one or more additional starting materials selected from: E) a polydiorganosiloxane having one or more terminally aliphatically unsaturated groups per molecule, F) an anchorage additive, and G) a solvent.

Starting material A) is a combination of a branched siloxane and a silsesquioxane. The combination may be a physical blend or mixture. The branched siloxane and the silsesquioxane are present in amounts relative to one another such that the amount of (A-I) the branched siloxane and the amount of (A-II) the silsesquioxane combined total 100 weight parts, based on the weight of the release coating composition. The branched siloxane may be present in an amount of 50 to 90 parts by weight and the silsesquioxane may be present in an amount of 10 to 50 parts by weight. Alternatively, the branched siloxane may be present in an amount of 50 to 80 parts by weight and the silsesquioxane may be present in an amount of 20 to 50 parts by weight. Alternatively, the branched siloxane may be present in an amount of 50 to 76 parts by weight and the silsesquioxane may be present in an amount of 24 to 50 parts by weight. Alternatively, the branched siloxane may be present in an amount of 50 to 70 parts by weight and the silsesquioxane may be present in an amount of 30 to 50 parts by weight. Without wishing to be bound by theory, it is thought that if the amount of silsesquioxane (A-II) exceeds 50 weight parts, per 100 weight parts the combined amounts of (A-1) the branched siloxane and (A-II) the silsesquioxane, the release coating formed from the composition may suffer from the drawback of migration, where silsesquioxane can migrate and contaminate a pressure sensitive adhesive in contact with the release coating.

The branched siloxane has unit formula (A-I): $(R^1_3SiO_{1/2})_a(R^2R^1_2SiO_{1/2})_b(R^1_2SiO_{2/2})_c(SiO_{4/2})_d$, where each $R^1$ is independently a monovalent hydrocarbon group free of aliphatic unsaturation or a monovalent halogenated hydrocarbon group free of aliphatic unsaturation and each $R^2$ is an aliphatically unsaturated monovalent hydrocarbon group, subscript a≥0, subscript b>0, 15≥c≥995, and subscript d is >0.

The monovalent hydrocarbon group for $R^1$ is exemplified by an alkyl group of 1 to 6 carbon atoms, an aryl group of 6 to 10 carbon atoms, a halogenated alkyl group of 1 to 6 carbon atoms, or a halogenated aryl group of 6 to 10 carbon atoms. Suitable alkyl groups for $R^1$ are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, as well as branched saturated hydrocarbon groups of 6 carbon atoms. Suitable aryl groups for $R^1$ are exemplified by, but not limited to, phenyl, tolyl, xylyl, naphthyl, benzyl, and dimethyl phenyl. Suitable halogenated alkyl groups for $R^1$ are exemplified by, but not limited to, the alkyl groups described above where one or more hydrogen atoms is replaced with a halogen atom, such as F or Cl. For example, fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl are examples of suitable halogenated alkyl groups. Suitable halogenated aryl groups for $R^1$ are exemplified by, but not limited to, the aryl groups described above where one or more hydrogen atoms is replaced with a halogen atom, such as F or Cl. For example, chlorobenzyl and fluorobenzyl are suitable halogenated aryl groups. Alternatively, each $R^1$ is independently a monovalent hydrocarbon group free of aliphatic unsaturation. Alternatively, each $R^1$ is an alkyl group. Alternatively, each $R^1$ is independently methyl, ethyl or propyl. Each instance of $R^1$ may be the same or different. Alternatively, each $R^1$ is a methyl group.

The aliphatically unsaturated monovalent hydrocarbon group for $R^2$ is capable of undergoing hydrosilylation reaction. Suitable aliphatically unsaturated hydrocarbon groups for $R^2$ are exemplified by an alkenyl group such as vinyl, allyl, butenyl, and hexenyl; and alkynyl groups such as ethynyl and propynyl. Alternatively, each $R^2$ may be vinyl or hexenyl. Each instance of $R^2$ may be the same or different. Alternatively, each $R^2$ is a vinyl group. The subscripts in the unit formula for (A-I) above may have values sufficient that the vinyl content of the branched siloxane for (A-I) may be 0.1% to 1%, alternatively 0.2% to 0.5%, based on the weight of branched siloxane (A-I).

In the unit formula for (A-I), subscript a≥0. Subscript b>0. Alternatively, subscript b≥3. Subscript c is 15 to 995. Subscript d is >0. Alternatively, subscript d≥1. Alternatively, for subscript a: 22≥a≥0; alternatively 20≥a≥0; alternatively 15≥a≥0; alternatively 10≥a≥0; and alternatively 5≥a≥0. Alternatively, for subscript b: 22≥b>0; alternatively 22≤b≥4; alternatively 20≥b≥0; alternatively 15≥b>1; alternatively 10≥b≥2; and alternatively 15≥b≥4. Alternatively, for subscript c: 800≥c≥15; and alternatively 400≥c≥15. Alternatively, for subscript d: 10≥d>0; alternatively, 10≥d≥1; alternatively 5≥d>0; and alternatively d=1. Alternatively, subscript d is 1 or 2. Alternatively, when subscript d=1, subscript a may be 0 and subscript b may be 4.

The branched siloxane may contain at least two polydiorganosiloxane chains of formula $(R^1_2SiO_{2/2})_r$, where each r is independently 2 to 100. Alternatively, the branched siloxane may comprise at least one unit of formula $(SiO_{4/2})$ bonded to four polydiorganosiloxane chains of formula $(R^1_2SiO_{2/2})_s$, where each s is independently 1 to 100.

The branched siloxane may be one branched siloxane or a combination of more than one branched siloxane of unit formula (A-I) that differ in one or more properties selected from molecular weight, structure, siloxane units and sequence. Suitable branched siloxanes for starting material A) are exemplified by those disclosed in U.S. Pat. No. 6,806,339.

The silsesquioxane has unit formula (A-II): $(R^1_3SiO_{1/2})_e(R^2R^1_2SiO_{1/2})_f(R^1_2SiO_{2/2})_g(R^1SiO_{3/2})_h$, where $R^1$ and $R^2$ are as described above, subscript e≥0, subscript f>0, subscript g is 15 to 995, and subscript h>0. Subscript e may be 0 to 10. Alternatively, for subscript e: 12≥e≥0; alternatively 10≥e≥0; alternatively 7≥e≥0; alternatively 5≥e≥0; and alternatively 3≥e≥0. Alternatively, subscript f≥1. Alternatively, subscript f≥3. Alternatively, for subscript f: 12≥f≥0; alternatively 12≥f≥3; alternatively 10≥f≥0; alternatively 7≥f>1; alternatively 5≥f≥2; and alternatively 7≥f≥3. Alternatively, for subscript g: 800≥g≥15; and alternatively 400≥g≥15. Alternatively, subscript h≥1. Alternatively, subscript h is 1 to 10. Alternatively, for subscript h: 10≥h>0; alternatively 5≥h>0; and alternatively h=1. Alternatively, subscript h is 1 to 10, alternatively subscript h is 1 or 2. Alternatively, when subscript h=1, then subscript f may be 3 and subscript e may be 0. The values for subscript f may be sufficient to provide the silsesquioxane of unit formula (A-II) with an alkenyl content of 0.1% to 1%, alternatively 0.2% to 0.6%, based on the weight of the silsesquioxane.

The silsesquioxane may be one silsesquioxane or a combination of more than one silsesquioxane of unit formula (A-II) that differ in one or more properties selected from molecular weight, structure, siloxane units and sequence. Suitable silsesquioxanes for starting material A) are exemplified by those disclosed in U.S. Pat. No. 4,374,967.

Starting material B) is a crosslinker having an average of at least 3 silicon bonded hydrogen atoms per molecule. The crosslinker is present in the release coating composition in an amount sufficient to provide a molar ratio of silicon bonded hydrogen atoms to aliphatically unsaturated groups (SiH:Vi ratio) of >1:1 to 5:1, alternatively 1.2:1 to 2:1. The crosslinker may by a polyorganohydrogensiloxane crosslinker of unit formula (B-I): $(R^1_3SiO_{1/2})_2(R^1_2SiO_{2/2})_k(R^1HSiO_{2/2})_m$, where $R^1$ is as described above and subscript k≥0, subscript m>0, and a quantity (m+k) is 8 to 400. Subscripts m and k may have values selected such that the polyorganohydrogensiloxane crosslinker has a viscosity of from 5 to 1000 mPa·s at 25° C., alternatively 10 to 350 mPa·s. The amount of starting material B) added to the release coating composition may be 0.5 to 10 parts by weight per 100 parts by weight of starting material A).

Polyorganohydrogensiloxanes for ingredient B) are exemplified by:
a) trimethylsiloxy-terminated poly(dimethylsiloxane/methylhydrogensiloxane),
b) trimethylsiloxy-terminated polymethylhydrogensiloxane, and
c) a combination of a) and b). The crosslinker may be one polyorganohydrogensiloxane crosslinker or a combination of two or more crosslinkers that differ in one or more properties selected from molecular weight, structure, siloxane units and sequence.

Starting material C) is a hydrosilylation reaction catalyst. The catalyst may be selected from the group consisting of: i. a metal selected from platinum, rhodium, ruthenium, palladium, osmium, and iridium; ii. a compound of the metal (i), iii. a complex of the compound (ii) with an organopolysiloxane, and iv. the compound (ii) microencapsulated in a matrix or core/shell type structure. Suitable hydrosilylation reaction catalysts are known in the art and are commercially available. Such conventional hydrosilylation catalysts can be a metal selected from platinum, rhodium, ruthenium, palladium, osmium, and iridium. Alternatively, the hydrosilylation catalyst may be a compound of such a metal, for example, chloroplatinic acid, chloroplatinic acid hexahydrate, platinum dichloride, and complexes of said compounds with low molecular weight organopolysiloxanes or platinum compounds microencapsulated in a matrix or core/shell type structure. Complexes of platinum with low molecular weight organopolysiloxanes include 1,3-diethenyl-1,1,3,3-tetramethyldisiloxane complexes with platinum. These complexes may be microencapsulated in a resin matrix. Exemplary hydrosilylation catalysts are described in U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are known in the art, as exemplified in U.S. Pat. Nos. 4,766,176 and 5,017,654.

Starting material D) is an inhibitor. The inhibitor may be selected from: acetylenic alcohols, silylated acetylenic compounds, cycloalkenylsiloxanes, ene-yne compounds, triazoles, phosphines, mercaptans, hydrazines, amines, dialkyl fumarates, dialkenyl fumarates, dialkoxyalkyl fumarates, maleates, nitriles, ethers, and combinations thereof. Suitable acetylenic alcohols include methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and a combination thereof. Suitable cycloalkenylsiloxanes include methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof. Suitable ene-yne compounds include 3-methyl-3-penten-1-yne, 3,5-dimethyl-3-hexen-1-yne. Suitable triazoles include benzotriazole. Suitable amines include tetramethyl ethylenediamine. Suitable fumarates include those disclosed in U.S. Pat. No. 4,774,111. Suitable maleates include diallyl maleate.

Alternatively, the inhibitor may be a silylated acetylenic compound. Without wishing to be bound by theory, it is thought that adding a silylated acetylenic compound reduces yellowing of the reaction product prepared from hydrosilylation reaction of the composition as compared to a reaction product from hydrosilylation of a composition that does not contain a silylated acetylenic compound or that contains an organic acetylenic alcohol stabilizer, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. The silylated acetylenic compound useful herein may be prepared by methods known in the art, such as silylating an acetylenic alcohol described above by reacting it with a chlorosilane in the presence of an acid receptor.

The amount of inhibitor added to the release coating composition will depend on various factors including the desired pot life of the release coating composition, whether the release coating composition will be a one part composition or a multiple part composition, the particular inhibitor used, and the selection and amount of crosslinker. However, the amount of inhibitor may be 0.001 to 1 parts by weight of inhibitor per 100 parts by weigh of starting material A). Alternatively, the amount of inhibitor may be alternatively 0.001% to 5%, alternatively 0.001% to 1%, alternatively 0.01% to 0.5%, and alternatively 0.0025% to 0.025%, based on the weight of all starting materials in the release coating composition.

Starting material E) is a polydiorganosiloxane having an average of one or more terminally aliphatically unsaturated groups per molecule. Starting material E) may comprise a polydiorganosiloxane of $$(R^1{}_2R^2SiO_{1/2})_2(R^1{}_2SiO)_n(R^1R^2SiO)_o,$$ Unit Formula (E-I):

$$(R^1{}_3SiO_{1/2})_2(R^1{}_2SiO)_p(R^1R^2SiO)_q,$$ Unit Formula (E-II):

or a combination thereof.

In unit formulae (E-I) and (E-II), $R^1$ and $R^2$ are described above. Subscript n is 5 to 10,000. Subscript o has a value sufficient to provide an $R^2$ content of 0.05% to 0.90% based on weight of the polydiorganosiloxane of unit formula (E-I). Subscript p is 5 to 10,000. Subscript q is sufficient to provide an $R^2$ content of 0.05% to 0.90% based on weight of the polydiorganosiloxane of unit formula (E-II).

Starting material E) may comprise a polydiorganosiloxane such as
i) dimethylvinylsiloxy-terminated polydimethylsiloxane,
ii) dimethylvinylsiloxy-terminated poly(dimethylsiloxane/methylvinylsiloxane),
iii) dimethylvinylsiloxy-terminated polymethylvinylsiloxane,
iv) trimethylsiloxy-terminated poly(dimethylsiloxane/methylvinylsiloxane),
v) trimethylsiloxy-terminated polymethylvinylsiloxane,
vi) dimethylvinylsiloxy-terminated poly(dimethylsiloxane/methylvinylsiloxane),
vii) dimethylvinylsiloxy-terminated poly(dimethylsiloxane/methylphenylsiloxane),
viii) dimethylvinylsiloxy-terminated poly(dimethylsiloxane/diphenylsiloxane),
ix) phenyl,methyl,vinyl-siloxy-terminated polydimethylsiloxane,
x) dimethylhexenylsiloxy-terminated polydimethylsiloxane,
xi) dimethylhexenylsiloxy-terminated poly(dimethylsiloxane/methylhexenylsiloxane),
xii) dimethylhexenylsiloxy-terminated polymethylhexenylsiloxane, xiii) trimethylsiloxy-terminated poly(dimethylsiloxane/methylhexenylsiloxane),
xiv) trimethylsiloxy-terminated polymethylhexenylsiloxane
xv) dimethylhexenyl-siloxy terminated poly(dimethylsiloxane/methylhexenylsiloxane),
xvi) dimethylvinylsiloxy-terminated poly(dimethylsiloxane/methylhexenylsiloxane)
xvii) a combination thereof.

The amount of starting material E) added to the release coating composition will depend on various factors including the type and amount of crosslinker selected for starting material B) and the aliphatic unsaturation content of starting material A). However, starting material E) may be added to the release coating composition in an amount of 0 to 50 parts by weight per 100 parts by weight of starting material A). Alternatively, starting material E) may be added to the release coating composition in an amount of 5 to 25 parts by weight. Starting material E) may be one polydiorganosiloxane or a combination of more than one polydiorganosiloxane that differ in one or more properties selected from molecular weight, structure, siloxane units and sequence.

Starting material F) is an anchorage additive. Suitable anchorage additives are exemplified by a reaction product of a vinyl alkoxysilane and an epoxy-functional alkoxysilane; a reaction product of a vinyl acetoxysilane and epoxy-functional alkoxysilane; and a combination (e.g., physical blend and/or a reaction product) of a polyorganosiloxane having at least one aliphatically unsaturated hydrocarbon group and at least one hydrolyzable group per molecule and an epoxy-functional alkoxysilane (e.g., a combination of a hydroxy-terminated, vinyl functional polydimethylsiloxane with glycidoxypropyltrimethoxysilane). Suitable anchorage additives and methods for their preparation are disclosed, for example, in U.S. Patent Application Publication Numbers 2003/0088042, 2004/0254274, and 2005/0038188; and EP 0 556 023. The exact amount of anchorage additive depends on various factors including the type of substrate and whether a primer is used, however, the amount of anchorage additive in the release coating composition may be 0 to 2 parts by weight, per 100 parts by weight of starting material A). Alternatively, the amount of anchorage additive, may be 0.01 to 2 parts by weight.

Starting material G) is a solvent. Suitable solvents include, polyalkylsiloxanes, alcohols, ketones, aromatic hydrocarbons, aliphatic hydrocarbons, glycol ethers, tetrahydrofuran, mineral spirits, naphtha, tetrahydrofuran, mineral spirits, naphtha, or a combination thereof. Polyalkylsiloxanes with suitable vapor pressures may be used as the solvent, and these include hexamethyldisiloxane, octamethyltrisiloxane, hexamethylcyclotrisiloxane and other low molecular weight polyalkylsiloxanes, such as 0.5 to 1.5 cSt Dow Corning® 200 Fluids and Dow Corning® OS FLUIDS, which are commercially available from Dow Corning Corporation of Midland, Mich., U.S.A.

Alternatively, starting material G) may comprise an organic solvent. The organic solvent can be an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, tetrahydrofuran; mineral spirits; naphtha; or a combination thereof.

The amount of solvent will depend on various factors including the type of solvent selected and the amount and type of other starting materials selected for the release coating composition. However, the amount of solvent may be 0% to 99%, alternatively 2% to 50%, based on the weight of all starting materials in the release coating composition. The solvent may be added during preparation of the release coating composition, for example, to aid mixing and delivery. All or a portion of the solvent may optionally be removed after the release coating composition is prepared.

The release coating composition may contain a release modifier to control (decrease) the level of release force (the adhesive force between the release coating and an adherend thereto, such as a label including a pressure sensitive adhesive). Release coating compositions having the required release force can be formulated from a modifier-free release coating composition by adjusting the level of modifier. Examples of suitable release modifiers include trimethylsiloxy-terminated dimethyl, phenylmethylsiloxanes. If used, a release modifier can for example be used at 0 to 85 parts by weight, alternatively 25 to 85 parts, per 100 parts of starting material A).

Other optional starting materials which may also be added to release coating compositions described herein include, for example, reactive diluents, fragrances, preservatives and fillers, for example, silica, quartz or chalk.

Alternatively, the release coating may be free of filler or contains only a limited amount of filler, such as 0 to 30% by weight of the release coating composition. Fillers can agglomerate or otherwise stick to the coater equipment used to apply the release coating. They can hinder optical properties, for example transparency, of the release coating and of the release liner formed therewith. The fillers may be prejudicial to the adherence of the adherend.

In one embodiment, the release coating composition of the invention may be free from fluoroorganosilicone compounds. It is believed that, during the cure, a fluorocompound, because of its low surface tension, will rapidly migrate to the interface of a coating composition and a substrate, for example a polyorganosiloxane release coating composition/PET film interface, and prevent adherence of the release coating (prepared by curing the release coating composition) to the substrate by making a fluorine containing barrier. By making a barrier, the fluorocompound prevents any component from reacting at the interface. Moreover, fluorosilicone compounds are usually expensive.

The release coating composition of the present invention may be prepared by mixing the starting materials together, for example, to prepare a one part composition. However, it may be desirable to prepare a release coating composition as a multiple part composition, in which the crosslinker and catalyst are stored in separate parts, until the parts are combined at the time of use (e.g., shortly before application to a substrate).

For example, a multiple part composition may comprise:
Part (A) a base part comprising A) the branched polyorganosiloxane blend and C) the catalyst, and when present, one or more of, E) the polydiorganosiloxane having terminally aliphatically unsaturated groups, F) the anchorage additive, and G) the solvent, and
Part (B) a curing agent part comprising A) the branched polyorganosiloxane blend and B) the crosslinker, and when present F) the anchorage additive and/or G) the solvent. The inhibitor may be added to either Part (A), Part (B), or both. Part (A) and Part (B) may be combined in a weight ratio (A):(B) of 1:1 to 10:1, alternatively 1:1 to 5:1, and alternatively 1:1 to 2:1. Part (A) and Part (B) may be provided in a kit with instructions for how to combine the parts to prepare the release coating composition and/or how to apply the release coating composition to a substrate.

Alternatively, when the anchorage additive is present, it can be incorporated in either of Part (A) or Part (B), or it can be added in a separate (third) part.

Alternatively, the release coating composition may be prepared by a method comprising:
1) mixing starting materials comprising A) the polyorganosiloxane blend, B) the crosslinker, C) the catalyst, D) the inhibitor, and optionally one or more of the E) polydiorganosiloxane having an average of one or more terminally aliphatically unsaturated groups per molecule, F) the anchorage additive, and G) the solvent, thereby forming a mixture;
2) applying the mixture on a substrate.

The release coating composition can for example be applied to the substrate by any convenient means such as spraying, doctor blade, dipping, screen printing or by a roll coater, e.g. an offset web coater, kiss coater or etched cylinder coater.

The release coating composition of the invention can be applied to any substrate, such as polymer film substrates, for example polyester, particularly polyethylene terephthalate (PET), polyethylene, polypropylene, or polystyrene films. The release coating composition can alternatively be applied to a paper substrate, including plastic coated paper, for example paper coated with polyethylene, glassine, super calender paper, or clay coated kraft. The release coating composition can alternatively be applied to a metal foil substrate, for example aluminum foil.

The method may further comprise: 3) treating the substrate before coating the mixture on the substrate. Treating the substrate may be preformed by any convenient means such as a plasma treatment or a corona discharge treatment. Alternatively, the substrate may be treated by applying a primer. In certain instances anchorage of the release coating may be improved if the substrate treated before coating.

The method may further comprise: 4) removing solvent, which may be performed by any conventional means, such as heating at 50° C. to 100° C. for a time sufficient to remove all or a portion of the solvent. The method may further comprise 5) curing the release coating composition to form a release coating on a surface of the substrate. Curing may be performed by any conventional means such as heating at 100° C. to 200° C.

Under production coater conditions cure can be affected in a residence time of 1 second to 6 seconds, alternatively from 1.5 seconds to 3 seconds, at an air temperature of 120-150° C. Heating for steps 4) and/or 5) can be performed in an oven, e.g., an air circulation oven or tunnel furnace or by passing the coated film around heated cylinders.

EXAMPLES

These examples are intended to illustrate some embodiments of the invention to one skilled in the art and are not to be interpreted as limiting the scope of the invention set forth in the claims. The following abbreviations were used: RF: Release Force (Release Tester), CW: Coat Weight (Oxford XRF), RO: Rub Off (Anchorage performance), and SAS: Subsequent Adhesion Strength (Migration performance). RT: Room temperature of 25° C. Table 1, below, shows the starting materials used in these examples. Unless otherwise indicated, viscosity is measured at 25° C.

TABLE 1

Starting Materials for Examples

| Abbreviation | Chemical description | Function |
| --- | --- | --- |
| Mixture 1 | 97.4% of a polyorganosiloxane including $SiO_{4/2}$, $Me_2SiO_{2/2}$, $Me_3SiO_{1/2}$, and $ViMe_2SiO_{1/2}$ units, with viscosity of 450 mPa · s at 25° C., with a vinyl content of 0.47%, where Me represents methyl and Vi represents vinyl | A-1) First (Q-branched) polyorganosiloxane |
|  | 2% of a polyorganosiloxane including $SiO_{4/2}$, $Me_2SiO_{2/2}$, $Me_3SiO_{1/2}$, and $ViMe_2SiO_{1/2}$ units, with viscosity of 40,000 mPa · s, and with a vinyl content of 0.20% where Me represents methyl and Vi represents vinyl | A-1) First (Q-branched) polyorganosiloxane |
|  | ETCH: 1-ETHYNYL-1-CYCLOHEXANOL 0.6% w/w, | D) Inhibitor |
| E-1 | Gum-like dimethylvinylsiloxy-terminated dimethylsiloxane-methylvinylsiloxane copolymer having a vinyl content of 0.19% and a degree of polymerization (DP of 9500) | E) Vinyl functional gum |
| E-2 | Gum-like trimethylsiloxy-terminated dimethylsiloxane-methylhexenylsiloxane copolymer 0.77% Vi | E) Hexenyl functional gum |
| B-1 | Trimethylsiloxy-endblocked methylhydrogenpolysiloxane having 20 mPa · s | B) Crosslinker |
| F-1 | SYL-OFF ® SL 9176 ANCHORAGE ADDITIVE commercially available from Dow Corning Corporation of Midland, Michigan, USA | F) Anchorage additive |
| A-2-1 | A polyorganosiloxane of unit formula $(Me_3SiO_{1/2})_{2.37}(ViMe_2SiO_{1/2})_{0.67}(Me_2SiO_{2/2})_{91.66}(MeSiO_{3/2})_{5.30}$ having a viscosity of 750 mPa · s and a vinyl content of 0.24% | A-2) Vinyl T branch polymer |
| A-2-2 | A polyorganosiloxane of unit formula $(Me_3SiO_{1/2})_{0.97}(ViMe_2SiO_{1/2})_{1.73}(Me_2SiO_{2/2})_{95.09}(MeSiO_{3/2})_{2.21}$ having a viscosity of 650 mPa · s and a vinyl content of 0.59% | A-2) Vinyl T branch polymer |
| C-1 | 1.5% by weight of Pt-1,3-divinyl-1,1,3,3-tetramethyldisiloxane complex in dimethyvinylsiloxy-terminated dimethylpolysiloxane having a viscosity of 450 mPa · s | C) Catalyst |

Reference Example 1—Release Coating Preparation

Release coating composition samples were prepared by the following steps I. and II., using the starting materials and amounts shown in the tables.
I. Add the following starting materials: Mixture 1, (and one or more of A-2-1, A-2-2, E-1 and E-2, if present), F-1, and B-1 in a beaker and mix until homogeneous. Add a suitable amount of toluene solvent, if needed to homogenize the starting materials.
II. Add C-1 catalyst and mix for 10 minutes, thereby forming a release coating composition.

The release coating composition was then coated on a PET substrate using a coater.
The release coating composition was cured via thermal addition cure in an oven (generally 140° C. for 30 seconds).

Reference Example 2—Release Coating Evaluation (1) Coat weight (CW) was evaluated using X-Ray to detect the coat weight of the cured release coating on the substrate with an Oxford lab-x 3500 instrument manufactured by Oxford Instruments PLC, Oxon, United Kingdom. Uncoated PET was used as a control sample (blank). The test method was FINAT Test Method No. 7 (FINAT Technical Handbook 7th edition, 2005).

(2) Coat weight after Rub off (CW RO) coat weight was evaluated as described above, and thereafter an Abrasion Tester (Elcometer 1720) was used to rub each sample 30 cycles at a speed of 30 cycles/minute. The coat weight was evaluated as described above again to measure the relative anchorage performance.

(3) Anchorage rate (RO %) was calculated as (CW after Rub-off)/(CW before Rub-off)×100%.

(4) Release force (RF-RT) was evaluated using the 180 degree peeling test to measure release force from the release liner. A Tesa 7475 standard tape was laminated on a cured release coating, a loaded weight of 20 g/cm$^2$ was placed on the laminated sample and left under RT (room temperature of 25° C.) for 20 hours. After 20 hours, the loaded weight was removed, and the sample was allowed to rest for 30 minutes. The release force was then tested by a ChemInstruments AR-1500 using FINAT Test Method No. 10 (FINAT Technical Handbook 7th edition, 2005).

(5) Release force (RF-70° C. aging) was evaluated using the 180 degree peeling test to measure release force from the release liner. A Tesa 7475 standard tape was laminated on a cured release coating, a loaded weight of 20 g/cm$^2$ was placed on the laminated sample and left under 70° C. for 20 hours. After 20 hours, the loaded weight was removed and the sample allowed to rest for 30 minutes. Release force was then tested by ChemInstruments AR-1500 using FINAT Test Method No. 10 (FINAT Technical Handbook 7th edition, 2005).

(6) SAS (Subsequent Adhesive Strength, indicator of migration) was evaluated as follows. A test tape was laminated by Nitto Denko 31B tape on a cured release coating under a loaded weight of 20 g/cm$^2$ and left under 70° C. for 20 hours. After 20 hours, the loaded weight was removed and the sample was allowed to rest 30 minutes at room temperature. Then transfer the 31B tape on PET substrate and wait for another 1 hour. The release force was tested by ChemInstruments AR-1500 using FINAT Test Method No. 11 (FINAT Technical Handbook 7th edition, 2005). In this SAS test, a laminate 31B tape on a PTFE substrate was tested, and the PTFE sample was treated the same way as a cured release coating sample. The SAS value was recorded as $RF_{release}/RF_{PTFE} \times 100\%$.

The starting materials and test results used to prepare different samples are shown in the tables.

Example 1

| Sample | Mixture 1 | | | Mixture 1 + 1% A-2-1 | | | Mixture 1 + 10% A-2-1 | | |
|---|---|---|---|---|---|---|---|---|---|
| Mixture 1(0.476) | 100 | | | 99 | | | 90 | | |
| A-2-1 (0.235) | | | | 1 | | | 10 | | |
| F-1 | 0.6 | | | 0.6 | | | 0.6 | | |
| B-1 (1.6% SiH) | 2 | | | 2 | | | 1.94 | | |
| C-1 (Pt level130 ppm) | 2.6 | | | 2.6 | | | 2.6 | | |
| SiH/Vi | 1.85 | | | 1.85 | | | 1.85 | | |
| Cure condition | 140 C.*30"/PET | | | 140 C.*30"/PET | | | 140 C.*30"/PET | | |
| Auto C/W | 1.313 | 1.038 | 1.156 | 1.019 | 1.055 | 1.193 | 1.118 | 1.089 | 0.976 |
| 1.1 g C/W RO | 1.282 | 1.059 | 1.137 | 1.009 | 1.05 | 1.19 | 1.115 | 1.07 | 0.954 |
| SAS RO % | 99.3 | | | 99.5 | | | 98.6 | | |
| Blank RF-RT | 3.4 | 3.8 | 3.5 | 3.5 | 3.8 | 3.4 | 3.4 | 3.3 | 3.3 |
| 769.0 RF-70C aging | 7.0 | 7.6 | 6.5 | 7.3 | 7.5 | 7.0 | 6.4 | 6.4 | 6.3 |
| 773.8 SAS | 759.9 | 766.4 | 764.3 | 763.5 | 760.7 | 772.3 | 749.3 | 756.5 | 750.5 |
| 782.1 SAS(%) | 98.5 | | | 98.8 | | | 97.0 | | |

| Sample | Mixture 1 + 24% A-2-1 | | | Mixture 1 + 50% A-2-1 | | |
|---|---|---|---|---|---|---|
| Mixture 1(0.476) | 76 | | | 50 | | |
| A-2-1 (0.235) | 24 | | | 50 | | |
| F-1 | 0.6 | | | 0.6 | | |
| B-1 (1.6% SiH) | 1.79 | | | 1.52 | | |
| C-1 (Pt level130 ppm) | 2.6 | | | 2.6 | | |
| SiH/Vi | 1.85 | | | 1.85 | | |
| Cure condition | 140 C.*30"/PET | | | 140 C.*30"/PET | | |
| Auto C/W | 1.289 | 1.079 | 1.076 | 0.973 | 1.078 | 1.210 |
| 1.1 g C/W RO | 1.182 | 1.008 | 1.001 | 0.770 | 0.788 | 0.976 |
| SAS RO % | 92.7 | | | 77.6 | | |
| Blank RF-RT | 2.7 | 2.8 | 2.8 | 2.2 | 2.1 | 2.4 |
| 769.0 RF-70C aging | 5.3 | 5.7 | 5.3 | 4.3 | 3.9 | 4.7 |

-continued

|  |  |  |  |  |  |  |
|---|---|---|---|---|---|---|
| 773.8 SAS | 716.8 | 704.8 | 722.3 | 682.8 | 687.3 | 659.7 |
| 782.1 SAS(%) |  | 92.2 |  |  | 87.3 |  |

This example shows that adding more vinyl functional silsesquioxane A-2-1 shows lower RF and lower SAS. The SAS with 50% A-2-1 in system still shows good SAS, because SAS is higher than 85%. This example shows the benefit of achieving a room temperature release force of less than 3 grams on PET substrate using the release coating composition of this invention.

Example 2

| Sample | Mixture 1 | Mixture 1 + 10% A-2-2 | Mixture 1 + 24% A-2-2 |
|---|---|---|---|
| Mixture 1(0.476) | 100 | 90 | 76 |
| A-2-2(0.59) |  | 10 | 24 |
| F-1 | 0.6 | 0.6 | 0.6 |
| B-1 (1.6% SiH) | 1.84 | 1.88 | 1.96 |
| C-1 (Pt level130 ppm) | 2.6 | 2.6 | 2.6 |
| SiH/Vi | 1.7 | 1.7 | 1.7 |
| Cure condition | 140 C.*30"/PET | 140 C.*30"/PET | 140 C.*30"/PET |

| | | | | | | | | | |
|---|---|---|---|---|---|---|---|---|---|
| Auto | C/W | 0.975 | 0.981 | 0.999 | 1.145 | 0.899 | 1.053 | 0.979 | 0.985 | 1.026 |
| 1.0 g | C/W RO | 0.928 | 0.796 | 0.886 | 1.037 | 0.78 | 0.918 | 0.897 | 0.9 | 0.989 |
| SAS | RO % |  | 90.7 |  |  | 88.0 |  |  | 93.2 |  |
| Blank | RF-RT | 5.4 | 4.6 | 4.7 | 3.3 | 3.4 | 3.5 | 3.2 | 3.5 | 3.4 |
| 698.6 | RF-70C aging | 6.3 | 6.1 | 6.5 | 4.9 | 4.9 | 4.8 | 4.7 | 4.9 | 4.9 |
| 688.7 | SAS | 641.9 | 605.2 | 631.3 | 614.2 | 612.4 | 615.0 | 595.2 | 620.2 | 601.4 |
| 675.2 | SAS(%) |  | 91.1 |  |  | 89.3 |  |  | 88.1 |  |

| Sample | Mixture 1 + 36% A-2-2 | Mixture 1 + 50% A-2-2 |
|---|---|---|
| Mixture 1(0.476) | 64 | 50 |
| A-2-2(0.59) | 36 | 50 |
| F-1 | 0.6 | 0.6 |
| B-1 (1.6% SiH) | 2.04 | 2.08 |
| C-1 (Pt level130 ppm) | 2.6 | 2.6 |
| SiH/Vi | 1.7 | 1.7 |
| Cure condition | 140 C.*30"/PET | 140 C.*30"/PET |

| | | | | | | | |
|---|---|---|---|---|---|---|---|
| Auto | C/W | 1.105 | 0.961 | 1.048 | 1.144 | 1.051 | 1.092 |
| 1.0 g | C/W RO | 1.037 | 0.871 | 0.923 | 1.011 | 0.920 | 1.007 |
| SAS | RO % |  | 90.9 |  |  | 89.4 |  |
| Blank | RF-RT | 3.1 | 3.6 | 3.4 | 3.2 | 3.2 | 3.4 |
| 698.6 | RF-70C aging | 4.8 | 5.0 | 5.0 | 4.4 | 4.6 | 4.7 |
| 688.7 | SAS | 632.5 | 598.2 | 607.8 | 616.0 | 597.1 | 606.5 |
| 675.2 | SAS(%) |  | 89.1 |  |  | 88.2 |  |

This example shows the release force reducing effect that occurs as the amount of vinyl functional silsesquioxane A-2-2 increases, and that release force and SAS remains stable when increasing amounts of A-2-2 were added into the release coating composition.

Example 3

| Sample | Mixture 1 | Mixture 1 + 24% A-2-1 + 16% E-1 | Mixture 1 + 24% A-2-1 + 32% E-1 |
|---|---|---|---|
| Mixture 1(0.476) | 100 | 60 | 44 |
| A-2-1 (0.235) | 0 | 24 | 24 |
| E-1 | 0 | 16 | 32 |
| E-2 | 0 | 0 | 0 |
| Toluene | 120 | 180 | 180 |
| F-1 | 0.6 | 0.6 | 0.6 |
| B-1 (1.6% SiH) | 1.84 | 1.44 | 1.27 |
| C-1 (Pt level130 ppm) | 2.6 | 2.6 | 2.6 |
| SiH/Vi | 1.7 | 1.7 | 1.7 |
| Cure condition | 140 C.*30"/PET | 140 C.*30"/PET | 140 C.*30"/PET |

| | | | | | | | | | |
|---|---|---|---|---|---|---|---|---|---|
| Bar | C/W | 0.705 | 0.758 | 0.769 | 0.664 | 0.649 | 0.641 | 0.652 | 0.628 | 0.658 |

-continued

| | | | | | | | | | |
|---|---|---|---|---|---|---|---|---|---|
| 0.7 g C/W RO | | 0.754 | 0.749 | 0.763 | 0.639 | 0.657 | 0.617 | 0.609 | 0.600 | 0.589 |
| SAS RO % | | | 99.3 | | | 97.9 | | | 92.8 | |
| Blank RF-RT | | 5.7 | 5.5 | 5.9 | 5.1 | 4.5 | 4.3 | 5.1 | 4.6 | 5.2 |
| 666.7 RF-70C aging | | 8.0 | 8.1 | 7.8 | 5.9 | 5.6 | 5.4 | 6.2 | 5.8 | 6.5 |
| 665.6 SAS | | 599.6 | 611.9 | 611.9 | 597.6 | 590.6 | 596.6 | 591.1 | 617.9 | 606.7 |
| 670.9 SAS (%) | | | 91.0 | | | 89.1 | | | 90.6 | |

| Sample | Mixture 1 + 24% A-2-1 + 16% E-2 | | | Mixture 1 + 24% A-2-1 + 32% E-2 | | |
|---|---|---|---|---|---|---|
| Mixture 1(0.476) | 60 | | | 44 | | |
| A-2-1 (0.235) | 24 | | | 24 | | |
| E-1 | 0 | | | 0 | | |
| E-2 | 16 | | | 32 | | |
| Toluene | 180 | | | 180 | | |
| F-1 | 0.6 | | | 0.6 | | |
| B-1 (1.6% SiH) | 1.8 | | | 2 | | |
| C-1 (Pt level130 ppm) | 2.6 | | | 2.6 | | |
| SiH/Vi | 1.7 | | | 1.7 | | |
| Cure condition | 140 C.*30"/PET | | | 140 C.*30"/PET | | |
| Bar C/W | 0.679 | 0.677 | 0.688 | 0.700 | 0.682 | 0.640 |
| 0.7 g C/W RO | 0.645 | 0.607 | 0.559 | 0.732 | 0.642 | 0.647 |
| SAS RO % | | 93.5 | | | 98.0 | |
| Blank RF-RT | 2.9 | 2.9 | 2.4 | 3.2 | 2.7 | 3.5 |
| 666.7 RF-70C aging | 4.7 | 5.0 | 4.2 | 5.2 | 4.8 | 5.1 |
| 665.6 SAS | 612.6 | 590.0 | 591.9 | 609.4 | 606.9 | 612.8 |
| 670.9 SAS (%) | | 89.6 | | | 91.3 | |

Example 3 shows that adding a vinyl or hexenyl functional gum (E-1 or E-2) improved the wetting or coating ability of the release coating composition. This example further shows that adding more vinyl functional silsesquioxane A-2-1 shows release force reducing effect.

INDUSTRIAL APPLICABILITY

A release coating composition containing a combination of a branched (MQ) siloxane and a silsesquioxane, is suitable for use in forming a cured release coating on substrates, and the cured release coatings have reduced release force as compared to coatings formed from compositions that do not contain sufficient silsesquioxane. The release coating formed from the present release coating composition also shows good subsequent adhesion strength. Without wishing to be bound by theory, it is thought that the combination of the branched siloxane (A-I) and the silsesquioxane (A-II) form a part cured network on a substrate that can provide a lower release force to sticky adhesives and while keeping high subsequent adhesion strength.

EMBODIMENTS OF THE INVENTION

In a first embodiment, a release coating composition comprises:
A) a combination of branched polyorganosiloxane, where the combination comprises
  I) 50 to 90 weight parts of a branched siloxane of unit formula (A-I) $(R^1_3SiO_{1/2})_a(R^2R^1_2SiO_{1/2})_b(R^1_2SiO_{2/2})_c(SiO_{4/2})_d$, where each $R^1$ is independently a monovalent hydrocarbon group free of aliphatic unsaturation and each $R^2$ is an aliphatically unsaturated hydrocarbon group, where subscript a≥0, subscript b>0, subscript c is 15 to 995, and subscript d is >0;
  II) 10 to 50 parts by weight of a silsesquioxane of unit formula (A-II) $(R^1_3SiO_{1/2})_e(R^2R^1_2SiO_{1/2})_f(R^1_2SiO_{2/2})_g(R^1SiO_{3/2})_h$, where subscript e≥0, subscript f>0, subscript g is 15 to 995, and subscript h>0;

where amount of the branched siloxane and amount of the silsesquioxane combined total 100 weight parts;
B) a crosslinker having at least 3 silicon bonded hydrogen atoms per molecule in an amount sufficient to provide a molar ratio of silicon bonded hydrogen atoms to aliphatically unsaturated groups (SiH:Vi ratio) in the release coating composition of >1:1 to 5:1, based on the weight of the release coating composition;
C) an amount of a platinum group metal catalyst sufficient to provide 1 to 1,000 ppm by weight of a platinum group metal, per 100 parts by weight of starting material A); and
D) 0.001 to 1 parts by weight, per 100 parts by weight of starting material A); of an inhibitor.

In a second embodiment, the release coating composition of the first embodiment has 22≥a≥0, 22≥b>0, 10≥d>0, 12≥e≥0, 12≥f>0, and 10≥h>0.

In a third embodiment, the release coating composition of the first embodiment has in the branched siloxane of unit formula (A-I), each $R^1$ is an alkyl group of 1 to 6 carbon atoms, each $R^2$ is an alkenyl group of 2 to 6 carbon atoms, subscript a is 0, subscript b is 4, subscript c is 15 to 995, and subscript d is 1.

In a fourth embodiment, the release coating composition of the third embodiment has each $R^1$ is methyl and each $R^2$ is vinyl or hexenyl.

In a fifth embodiment, the release coating composition of the first embodiment has in the silsesquioxane of formula (A-II), each $R^1$ is an alkyl group of 1 to 6 carbon atoms, each $R^2$ is an alkenyl group of 2 to 6 carbon atoms, subscript e is 0, subscript f is 3, subscript g is 15 to 995, and subscript h is 1.

In a sixth embodiment, the release coating composition of the fifth embodiment has each $R^1$ is methyl and each $R^2$ is vinyl or hexenyl.

In a seventh embodiment, in the release coating composition of the first embodiment B) the crosslinker has unit formula (B-1): $(R^1_3SiO_{1/2})_2(R^1_2SiO_{2/2})_k(R^1HSiO_{2/2})_m$, where subscript k≥0, subscript m>0, and a quantity (m+k) is 8 to 400.

In an eighth embodiment, the release coating composition of the seventh embodiment has each $R^1$ is an alkyl group of 1 to 6 carbon atoms, and each $R^2$ is an alkenyl group of 2 to 6 carbon atoms.

In a ninth embodiment, the release coating composition of the eighth embodiment has each $R^1$ is methyl and each $R^2$ is vinyl or hexenyl.

In a tenth embodiment, in the release coating composition of the first embodiment, C) the catalyst is selected from the group consisting of: i. a metal selected from platinum, rhodium, ruthenium, palladium, osmium, and iridium; ii. a compound of the metal (i), iii. a complex of the compound (ii) with an organopolysiloxane, and iv. the compound (ii) microencapsulated in a matrix or core/shell type structure.

In an eleventh embodiment, in the release coating composition of the first embodiment, D) the inhibitor is selected from: acetylenic alcohols, silylated acetylenic compounds, cycloalkenylsiloxanes, ene-yne compounds, triazoles, phosphines, mercaptans, hydrazines, amines, dialkyl fumarates, dialkenyl fumarates, dialkoxyalkyl fumarates, maleates, nitriles, ethers, and combinations thereof.

In a twelfth embodiment, the release coating composition of the first embodiment further comprises one or more additional ingredients selected from:
E) a polydiorganosiloxane having an average of one or more aliphatically unsaturated groups per molecule,
F) an anchorage additive, and
G) a solvent.

In a thirteenth embodiment, in the release coating composition of the twelfth embodiment, E) the aliphatically unsaturated polydiorganosiloxane is present and has a formula selected from:

unit formula (E-I):

unit formula (E-II):

or a combination thereof, where subscript n is 5 to 10,000, subscript o is sufficient to provide an $R^2$ content of 0.05% to 0.90%; subscript p is 5 to 10,000 and subscript q is sufficient to provide an $R^2$ content of 0.05% to 0.90%.

In a fourteenth embodiment, in the release coating composition of the twelfth embodiment, F) the anchorage additive is present, and the anchorage additive is a combination of a polyorganosiloxane having at least one aliphatically unsaturated hydrocarbon group and at least one hydrolyzable group per molecule and an epoxy-functional alkoxysilane.

In a fifteenth embodiment, in the release coating composition of the twelfth embodiment, the solvent is present, and the solvent is selected from: polyalkylsiloxanes, alcohols, ketones, aromatic hydrocarbons, aliphatic hydrocarbons, glycol ethers, tetrahydrofuran, mineral spirits, naphtha, or a combination thereof.

In a sixteenth embodiment, a method for making a release liner comprises:
1) applying to a substrate, a release coating composition comprising:
A) a combination of branched polyorganosiloxanes, where the combination comprises
I) 50 to 90 weight parts of a branched siloxane of unit formula (A-I) $(R^1_3SiO_{1/2})_a(R^2R^1_2SiO_{1/2})_b(R^1_2SiO_{2/2})_c(SiO_{4/2})_d$, where each $R^1$ is independently a monovalent hydrocarbon group free of aliphatic unsaturation and each $R^2$ is an aliphatically unsaturated hydrocarbon group, where subscript a≥0, subscript b>0, subscript c is 15 to 995, and subscript d is >0;

II) 10 to 50 parts by weight of a silsesquioxane of unit formula (A-II) $(R^1_3SiO_{1/2})_e(R^2R^1_2SiO_{1/2})_f(R^1_2SiO_{2/2})_g(R^1SiO_{3/2})_h$, where subscript e≥0, subscript f>0, subscript g is 15 to 995, and subscript h>0;
where amount of the branched siloxane and amount of the silsesquioxane combined total 100 weight parts;
B) a crosslinker having at least 3 silicon bonded hydrogen atoms per molecule in an amount sufficient to provide a molar ratio of silicon bonded hydrogen atoms to aliphatically unsaturated groups (SiH:Vi ratio) in the release coating composition of >1:1 to 5:1, based on the weight of the release coating composition;
C) an amount of a platinum group metal catalyst sufficient to provide 1 to 1,000 ppm by weight of a platinum group metal, per 100 parts by weight of starting material A); and
D) 0.001 to 1 parts by weight, per 100 parts by weight of starting material A); of an inhibitor, thereby forming a mixture,
optionally E) a polydiorganosiloxane having an average of one or more terminally aliphatically unsaturated groups per molecule;
optionally F) an anchorage additive; and
optionally G) a solvent, thereby forming a release coating composition; and
2) heating the release coating composition, thereby curing the release coating composition to form a cured release coating on the substrate.

In a seventeenth embodiment, the method of the sixteenth embodiment further comprises treating the substrate before applying the release coating composition.

In an eighteenth embodiment, the method of the sixteenth embodiment has 22≥a≥0, 22≥b>0, 995≥c≥15, 10≥d>0, 12≥e≥0, 12≥f>0, 995≥g≥15, and 10≥h>0.

In a ninteenth embodiment, the method of the sixteenth embodiment has in the branched siloxane of unit formula (A-I), each $R^1$ is an alkyl group of 1 to 6 carbon atoms, each $R^2$ is an alkenyl group of 2 to 6 carbon atoms, subscript a is 0, subscript b is 4, subscript c is 15 to 995, and subscript d is 1.

In a twentieth embodiment, the method of the ninteenth embodiment has each $R^1$ is methyl and each $R^2$ is vinyl or hexenyl.

In a twenty-first embodiment, the method of the sixteenth embodiment has in the silsesquioxane of formula (A-II), each $R^1$ is an alkyl group of 1 to 6 carbon atoms, each $R^2$ is an alkenyl group of 2 to 6 carbon atoms, subscript e is 0, subscript f is 3, subscript g is 15 to 995, and subscript h is 1.

In a twenty-second embodiment, the method of the twenty-first embodiment has each $R^1$ is methyl and each $R^2$ is vinyl or hexenyl.

In a twenty-third embodiment, in method of the sixteenth embodiment, B) the crosslinker has unit formula (B-1): $(R^1_3SiO_{1/2})_2(R^1_2SiO_{2/2})_k(R^1HSiO_{2/2})_m$, where subscript k≥0, subscript m>0, and a quantity (m+k) is 8 to 400.

In a twenty-fourth embodiment, the method of the twenty-third embodiment has each $R^1$ is an alkyl group of 1 to 6 carbon atoms, and each $R^2$ is an alkenyl group of 2 to 6 carbon atoms.

In a twenty-fifth embodiment, the method of the twenty-third embodiment has each $R^1$ is methyl and each $R^2$ is vinyl or hexenyl.

In a twenty-sixth embodiment, in the method of the sixteenth embodiment, C) the catalyst is selected from the group consisting of:
i. a metal selected from platinum, rhodium, ruthenium, palladium, osmium, and iridium;

ii. a compound of the metal (i), iii. a complex of the compound (ii) with an organopolysiloxane, and iv. the compound (ii) microencapsulated in a matrix or core/shell type structure.

In a twenty-seventh embodiment, in the method of the sixteenth embodiment, D) the inhibitor is selected from: acetylenic alcohols, silylated acetylenic compounds, cycloalkenylsiloxanes, ene-yne compounds, triazoles, phosphines, mercaptans, hydrazines, amines, dialkyl fumarates, dialkenyl fumarates, dialkoxyalkyl fumarates, maleates, nitriles, ethers, and combinations thereof.

In a twenty-eighth embodiment, the method of the sixteenth embodiment further comprises one or more additional ingredients selected from:
E) a polydiorganosiloxane having an average of one or more aliphatically unsaturated groups per molecule,
F) an anchorage additive, and
G) a solvent.

In a twenty-ninth embodiment, in method of the twenty-eight embodiment, E) the aliphatically unsaturated polydiorganosiloxane is present and has a formula selected from: unit formula (E-I): $(R^1_2R^2SiO)_2(R^1_2SiO)_n(R^1R^2SiO)_o$, unit formula (E-II):
$(R^1_3SiO)_2(R^1_2SiO)_p(R^1R^2SiO)_q$, or a combination thereof, where subscript n is 5 to 10,000, subscript o is sufficient to provide an $R^2$ content of 0.05% to 0.90%; subscript p is 5 to 10,000 and subscript q is sufficient to provide an $R^2$ content of 0.05% to 0.90%.

In a thirtieth embodiment, in method of the twenty-eight embodiment, F) the anchorage additive is present, and the anchorage additive is a combination of a polyorganosiloxane having at least one aliphatically unsaturated hydrocarbon group and at least one hydrolyzable group per molecule and an epoxy-functional alkoxysilane.

In a thirty-first embodiment, in method of the twenty-eight embodiment embodiment, the solvent is present, and the solvent is selected from: polyalkylsiloxanes, alcohols, ketones, aromatic hydrocarbons, aliphatic hydrocarbons, glycol ethers, tetrahydrofuran, mineral spirits, naphtha, or a combination thereof.

In a thirty second-embodiment, a release liner prepared by the method of of the sixteenth embodiment.

What is claimed is:

1. A release coating composition comprising:
    A) a combination of branched polyorganosiloxanes, where the combination comprises
        I) 50 to 90 weight parts of a branched siloxane of unit formula (A-I) $(R^1_3SiO_{1/2})_a(R^2R^1_2SiO_{1/2})_b(R^1_2SiO_{2/2})_c(SiO_{4/2})_d$, where each $R^1$ is independently a monovalent hydrocarbon group free of aliphatic unsaturation and each $R^2$ is an aliphatically unsaturated hydrocarbon group, where subscript a≥0, subscript b>0, subscript c is 15 to 995, and 10≥d>0;
        II) 10 to 50 parts by weight of a silsesquioxane of unit formula (A-II) $(R^1_3SiO_{1/2})_e(R^2R^1_2SiO_{1/2})_f(R^1_2SiO_{2/2})_g(R^1SiO_{3/2})_h$, where each $R^1$ is independently a monovalent hydrocarbon group free of aliphatic unsaturation and each $R^2$ is an aliphatically unsaturated hydrocarbon group, subscript e≥0, subscript f>0, subscript g is 15 to 995, and 10≥h>0;
        where an amount of the branched siloxane and an amount of the silsesquioxane combined total 100 weight parts;
    B) a crosslinker having at least 3 silicon bonded hydrogen atoms per molecule in an amount sufficient to provide a molar ratio of silicon bonded hydrogen atoms to aliphatically unsaturated groups (SiH:Vi ratio) in the release coating composition of >1:1 to 5:1;
    C) an amount of a platinum group metal catalyst sufficient to provide 1 to 1,000 ppm by weight of a platinum group metal, per 100 parts by weight of the combination A); and
    D) 0.001 to 1 parts by weight, per 100 parts by weight of the combination A); of an inhibitor.

2. The release coating composition of claim 1, further comprising one or more additional ingredients selected from:
    E) a polydiorganosiloxane having an average of one or more aliphatically unsaturated groups per molecule,
    F) an anchorage additive, and
    G) a solvent.

3. The release coating composition of claim 1, where 22≥a≥0, 22≥b>0, 995≥c≥15, 10≥d>0, 12≥e≥0, 12 f>0, 995≥g≥15, and 10≥h>0.

4. The release coating composition of claim 1, where in the branched siloxane of unit formula (A-I) each $R^1$ is an alkyl group of 1 to 6 carbon atoms, each $R^2$ is an alkenyl group of 2 to 6 carbon atoms, subscript a is 0, subscript b is 4, subscript c is 15 to 995, and subscript d is 1.

5. The release coating composition of claim 1, where in the silsesquioxane of formula (A-II), each $R^1$ is an alkyl group of 1 to 6 carbon atoms, each $R^2$ is an alkenyl group of 2 to 6 carbon atoms, subscript e is 0, subscript f is 3, subscript g is 15 to 995, and subscript h is 1.

6. The release coating composition of claim 1, where B) the crosslinker has unit formula (B-1):
$(R^1_3SiO_{1/2})_2(R^1_2SiO_{2/2})_k(R^1HSiO_{2/2})_m$, where each $R^1$ is independently a monovalent hydrocarbon group free of aliphatic unsaturation and each $R^2$ is an aliphatically unsaturated hydrocarbon group, subscript k≥0, subscript m>0, and a quantity (m+k) is 8 to 400.

7. The release coating composition of claim 2, where E) the aliphatically unsaturated polydiorganosiloxane is present and has a formula selected from:

$(R^1_2R^2SiO)_2(R^1_2SiO)_n(R^1R^2SiO)_o$,     unit formula (E-1):

$(R^1_3SiO)_2(R^1_2SiO)_p(R^1R^2SiO)_q$,     unit formula (E-II):

or a combination thereof, where each $R^1$ is independently a monovalent hydrocarbon group free of aliphatic unsaturation and each $R^2$ is an aliphatically unsaturated hydrocarbon group, subscript n is 5 to 10,000, subscript o is sufficient to provide an $R^2$ content of 0.05% to 0.90%; subscript p is 5 to 10,000 and subscript q is sufficient to provide an $R^2$ content of 0.05% to 0.90%.

8. The release coating composition of claim 2, where F) the anchorage additive is present, and the anchorage additive is a combination of a polyorganosiloxane having at least one aliphatically unsaturated hydrocarbon group and at least one hydrolyzable group per molecule and an epoxy-functional alkoxysilane.

9. The release coating composition of claim 1, where in the branched siloxane of unit formula (A-I) and in the silsesquioxane of formula (A-II), each $R^1$ is an alkyl group of 1 to 6 carbon atoms and each $R^2$ is an alkenyl group of 2 to 6 carbon atoms.

10. The release coating composition of claim 9, where in the branched siloxane of unit formula (A-I) and in the silsesquioxane of formula (A-II), each $R^1$ is methyl and each $R^2$ is vinyl or hexenyl.

11. The release coating composition of claim 2, where the solvent is present, and the solvent is selected from: polyalkylsiloxanes, alcohols, ketones, aromatic hydrocarbons, aliphatic hydrocarbons, glycol ethers, tetrahydrofuran, mineral spirits, naphtha, or a combination thereof.

12. The release coating composition of claim 1, where C) the catalyst is selected from the group consisting of:
   i. a metal selected from platinum, rhodium, ruthenium, palladium, osmium, and iridium;
   ii. a compound of the metal (i),
   iii. a complex of the compound (ii) with an organopolysiloxane, and
   iv. the compound (ii) microencapsulated in a matrix or core/shell type structure.

13. The release coating composition of claim 1, where D) the inhibitor is selected from: acetylenic alcohols, silylated acetylenic compounds, cycloalkenylsiloxanes, ene-yne compounds, triazoles, phosphines, mercaptans, hydrazines, amines, dialkyl fumarates, dialkenyl fumarates, dialkoxyalkyl fumarates, maleates, nitriles, ethers, and combinations thereof.

14. A method for making a release liner comprising:
1) applying to a substrate, a release coating composition comprising:
   A) a combination of branched polyorganosiloxanes, where the combination comprises
      I) 50 to 90 weight parts of a branched siloxane of unit formula (A-I) $(R^1_3SiO_{1/2})_a(R^2R^1_2SiO_{1/2})_b(R^1_2SiO_{2/2})_c(SiO_{4/2})_d$, where each $R^1$ is independently a monovalent hydrocarbon group free of aliphatic unsaturation and each $R^2$ is an aliphatically unsaturated hydrocarbon group, where subscript $a \geq 0$, subscript $b > 0$, subscript $c$ is 15 to 995, and $10 \geq d > 0$;
      II) 10 to 50 parts by weight of a silsesquioxane of unit formula (A-III) $(R^1_3SiO_{1/2})_e(R^2R^1_2SiO_{1/2})_f(R^1_2SiO_{2/2})_g(R^1SiO_{3/2})_h$, where each $R^1$ is independently a monovalent hydrocarbon group free of aliphatic unsaturation and each $R^2$ is an aliphatically unsaturated hydrocarbon group, subscript $e \geq 0$, subscript $f > 0$, subscript $g$ is 15 to 995, and $10 \geq h > 0$;
      where an amount of the branched siloxane and an amount of the silsesquioxane combined total 100 weight parts;
   B) a crosslinker having at least 3 silicon bonded hydrogen atoms per molecule in an amount sufficient to provide a molar ratio of silicon bonded hydrogen atoms to aliphatically unsaturated groups (SiH:Vi ratio) in the release coating composition of >1:1 to 5:1;
   C) an amount of a platinum group metal catalyst sufficient to provide 1 to 1,000 ppm by weight of a platinum group metal, per 100 parts by weight of the combination A); and
   D) 0.001 to 1 parts by weight, per 100 parts by weight of the combination A); of an inhibitor, thereby forming a mixture,
   optionally E) a polydiorganosiloxane having an average of one or more terminally aliphatically unsaturated groups per molecule;
   optionally F) an anchorage additive; and
   optionally G) a solvent, thereby forming a release coating composition; and
optionally 2) treating the substrate before applying the release coating composition, and
3) heating the release coating composition, thereby curing the release coating composition to form a cured release coating on the substrate.

15. A release liner prepared by the method of claim 14.

* * * * *

UNITED STATES PATENT AND TRADEMARK OFFICE
CERTIFICATE OF CORRECTION

PATENT NO. : 11,008,480 B2
APPLICATION NO. : 16/348277
DATED : May 18, 2021
INVENTOR(S) : Huang et al.

It is certified that error appears in the above-identified patent and that said Letters Patent is hereby corrected as shown below:

In the Claims

Column 20, Claim 3, Line 17, insert:
--$22 \geq a \geq 0, 22 \geq b > 0, 995 \geq c \geq 15, 10 \geq d > 0, 12 \geq e \geq 0, 12 \geq f > 0$,--

Column 20, Claim 7, Line 42, insert:
--$(R^1_3SiO)_2(R^1_2SiO)_p(R^1R^2SiO)_q$, unit formula (E-II):--

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*